United States Patent Office 3,133,135
Patented May 12, 1964

3,133,135
PROCESS FOR PREPARING SOLID SHAPED ARTICLES
Harlan V. Ogle, Waynesboro, Va., assignor to E. I. du Pont de Nemours and Company, Wilmington, Del., a corporation of Delaware
No Drawing. Filed July 29, 1960, Ser. No. 46,083
12 Claims. (Cl. 264—182)

This invention relates to a novel process for preparing shaped articles from ethylenically unsaturated monomers and to new shaped articles. More particularly, this invention relates to a process for shaping a viscous solution containing certain ethylenically unsaturated monomers and simultaneously effecting polymerization to provide polymeric products in the form of filaments, films, and the like.

Among the high-melting polymers exhibiting strong intermolecular cohesion which are prepared from ethylenically unsaturated monomers and are of interest in the preparation of shaped articles such as fibers, films, foils, and the like, none is known which is soluble in its monomer. These polymers, when polymerized in bulk monomer, precipitate, forming a slurry of solid polymer in the remaining monomer. The slurry does not, at any stage, become thickened to the point of having a substantially increased viscosity during such a polymerization process. Since a relatively high viscosity is necessary to make shaped articles self supporting immediately after extrusion, such monomers have been precluded from consideration in processes for simultaneously polymerizing the monomer while shaping films or fibers. For example, acrylonitrile, one of the most important monomers in this field, cannot be prepolymerized to form a viscous mass suitable for spinning because of the insolubility of the polymer in the monomer. No matter how rapidly acrylonitrile can be made to polymerize, during or after its passage through an orifice, it does not provide a self-supporting shaped article because the unpolymerized monomer does not dissolve or even plasticize the polymer. Accordingly, in the preparation of shaped articles from such polymers, it has been customary to first prepare the polymer by convention polymerization techniques and then to dissolve the polymer in a suitable solvent or heat it to form an extrudable melt.

It is, therefore, an object of this invention to provide a process whereby ethylenically unsaturated monomers which are not solvents for their polymers may be simultaneously polymerized while being shaped into fibers, films, and the like. It is a further object to provide a process for the production of fibers, films, and the like from addition polymers which does not require melting or the use of a solvent for those polymers. It is yet another object of the present invention to provide a process for the preparation of fibers, films, and the like which are cross linked. Still another object is to provide fine denier filaments and thin films of organic polymers which are insoluble in known solvents. A still further object of this invention is to provide spinning and casting solutions of organic polymers dissolved in ethylenically unsaturated monomers which fail to dissolve their own polymers and copolymers. Other objects of the invention will appear hereinafter.

In accordance with the present invention, it has been found that coherent shaped articles can be prepared directly by polymerizing ethylenically unsaturated monomers, the polymers of which are insoluble in their monomer, by dissolving an organic polymer in at least one of the monomers to form a viscous solution, thereafter shaping the solution, e.g., by extrusion or casting, and simultaneously initiating polymerization of the monomer. A solid shaped article, ranging from a uniformly delustered to a clear homogeneous structure comprised of the polymerized monomer and the organic polymer, is provided. The reaction which takes place may be confined to the addition polymerization of the monomeric component or, in cases where the polymeric solute contains sites reactive with the polymerizing monomer, branch formation or cross linking takes place. In the latter case, polymeric products which are solvent-insoluble are obtained.

In general, the conditions for carrying out the process of the present invention are not critical. Both wet and dry shaping processes may be used with the temperatures being selected from those useful in known processes for polymerizing the monomeric substituents. Temperatures in the range from about −80° C. to about 90° C. may be used with a preferred range being from about −20° C. to about 50° C. Since the extruded solutions do not contain solvents which must be extracted, temperatures substantially lower than those used in commercial practice may be used in the dry shaping process. However, in both wet and dry shaping, the temperature must be below the boiling point of the reactants under the pressure conditions used and above that at which phase separation would occur prior to and during the shaping step. Optimum conditions will, of course, vary, depending on the particular combination of materials being shaped.

By "wet and dry shaping processes" it is meant that the shaping may take place in liquid media or in gaseous media. It will be apparent from the discussion which follows that the media used do not have the same function as in the usual wet and dry spinning or casting processes since they do not coagulate a prepolymerized product by removal of solvent but merely act as inert media for polymerization, with the inert media acting as a carrier for a part of the initiator system in some cases and aiding in the control of the temperature of the polymerization if desired.

By "simultaneously polymerizing" it is meant that no discernible period of time elapses from the time when the viscous solution is shaped and enters the inert medium to the time when polymerization begins.

By the term "solvent insoluble" as applied to the final products it is meant that at least 5% by weight of the shaped article remains insoluble after being immersed in boiling N,N-dimethylformamide for a period of three hours. In all cases the insoluble portion substantially retains the shape of the original shaped article.

The polymerization can be initiated or catalyzed and accelerated by the use of a wide variety of well-known systems. The system is not critical except that the components must, of course, be soluble in the media in which they are present and the complete system must not be present or at least not be active prior to the shaping step. Thus, the polymer/monomer solution may contain the oxidizing portion of a redox polymerization system and the medium into which the solution is placed during the shaping operation may contain the reducing portion of that system. Alternatively, the reductant may be dissolved in the solution and the oxidant may be present in the shaping medium. However, neither part of the initiator system need be in the viscous solution, e.g., both may be present in the shaping medium. In another alternative procedure, a promotor for irradiation-catalyzed polymerization may be dissolved in the solution to be shaped and the solution may be irradiated during the shaping step. In still another alternative procedure, a temperature sensitive initiator may be dissolved in the solution to be shaped, and this solution may be brought to a sufficient temperature to activate the initiator during the shaping operation. From the foregoing discussion it will be obvious that any initiator system may be used which is effective in promoting polymerization to a useful degree immediately following the shaping step.

Any one of the known ethylenically unsaturated monomers which is polymerizable below its boiling point and the polymers of which are insoluble in the monomer may be shaped and simultaneously polymerized by the process of this invention to provide polymeric products having a wide range of properties. Among the monomers falling within this definition are acrylonitrile, vinylidene chloride, vinylidene cyanide, alpha-chloroacrylonitrile, vinyl fluoride, vinylidene fluoride, tetrafluoroethylene, and vinyl chloride. The process is not limited to the use of a single monomer species in the solution but is also applicable to the use of mixtures of monomers, the copolymers of which are insoluble in the mixture of the comonomers. These monomers may or may not be polymerizable with the polymeric ingredient in the solution. Minor amounts of additional monomers may also be included to enhance certain properties of the final shaped article. For example, in systems in which acrylonitrile predominates, additional monomers, e.g., methyl acrylate, trimethylammonium styrenesulfonate, vinylpyridine, and the like, may be added to enhance the dyeing characteristics of the shaped article. It must be noted, however, that whenever monomer mixtures are used, the monomers must be copolymerizable and miscible with one another.

The polymeric ingredients may be chosen from a wide variety of materials, the only requirements being that they are soluble in the monomer system to provide a viscous solution capable of forming a self-supporting film upon being shaped and that they not interfere with the polymerization of the monomer. Thus, they may be inert to the polymerization system or, as indicated previously, they may participate in the polymerization by reacting with one or more of the monomer solvents. Also, more than one soluble polymer may be present in the system.

The amount of the polymeric solute and monomer in the solution are not critical except that the ratio of monomer to polymer must be great enough to dissolve the polymer to provide a viscous solution having a viscosity of at least about 5 poises at the shaping and polymerization temperatures. The solution should, however, contain not less than a significant fractional part by weight of the monomer. For example, as little as 4% of a high molecular weight polymeric solute or as much as 90% of a lower molecular weight polymeric solute may be used to provide a viscous solution. Preferably, from about 5% to about 75% by weight of the polymeric solute is used.

The molecular weights of the polymeric ingredients may, of course, vary over a wide range, e.g., from about three thousand to a million or more. As indicated previously, greater amounts of the lower molecular weight polymers will generally be required to provide the desired viscosity. The viscosity of some of the polymeric materials may also vary with the temperatures used in shaping and polymerizing the solution. Therefore, the selection of the material should be tailored to the specific processing conditions used. Preferably, a polymeric material is selected to provide a solution viscosity in the range from about 15 to about 1000 poises at the shaping and polymerization temperatures.

The amount of monomer used must be sufficient to dissolve the polymeric solute to the extent that a viscous solution is provided. The solvent power of representative ethylenically unsaturated monomers, e.g., acrylonitrile, vinylidene halides, vinylidene cyanide, vinyl halides, etc., may be increased by the addition of other copolymerizable monomers such as N-vinylpyrrolidone, N-vinylmethylformamide, vinylmethylsulfoxide, vinylmethylsulfone, as well as others. Such monomers also aid in providing clear, coherent films and fibers as will be further described later herein. Monomers containing two or more polymerizable, ethylenically unsaturated or active olefinic groups per molecule such as divinyl benzene, ethylene diacrylate, ethylene dimethacrylate, glyceryl trimethacrylate, N,N-methylene-bis-acrylamide, tetramethylene glycol dimethacrylate, tetramethylene diacrylate, tetramethylene dimethacrylate, divinylsulfone, etc., may be included to provide cross-linked products as will also be more fully described later herein. The additional monomers must, of course, be so selected as not to interfere unduly with the dissolving of the polymeric solute or with the polymerization reaction.

The polymeric solute may be selected from a wide variety of materials, e.g., polyvinyls, polyvinylidenes, polyacrylics, substituted polyacrylics, polydienes, substituted polydienes, polyallyls, polyesters, polyamides, polyurethanes, polysulfides, polyepoxides, polyacetals, polyanhydrides, cellulose ethers, cellulose esters, nitrocellulose, and copolymers and terpolymers of such materials. Different types of polymeric materials can be used to give specific end products. For example, clear, lustrous products can be obtained when the dissolved polymer is compatible with the polymerization product of the monomer, or when the dissolved polymer contains sites reactive with the polymerizing monomer, e.g., unsaturated linkages, chain-transfer sites, polymerization initiating sites, or other configurations leading to an appreciable degree of chemical reaction between the polymerizing monomer or a growing polymer chain and the polymeric material. Stable, uniformly delustered products may be obtained by selecting a polymeric material that is nonreactive with the monomer, i.e., does not enter into the polymerization and is not compatible with the polymerization product of the monomer.

Polymeric products having a wide range of properties may be prepared by the process of this invention. The molecular weights may vary from about fifteen thousand to more than one million. All may be classified as film- or fiber-forming in that they provide self-supporting shaped articles. Polymeric products ranging from relatively soluble, e.g., 99% soluble, to completely insoluble may be prepared as will be more fully described later herein.

Shaped articles not heretofore attainable by known polymerization processes may be prepared by the process of this invention. For example, by selecting a polymeric solute containing carbon-to-carbon unsaturation, it is possible to obtain fine denier filaments having a denier from about 1 to about 200 and films having a thickness from about 1 mil to about 0.5 cm. from polymers which are solvent insoluble. When the degree of unsaturation of the polymeric solute is such that one or more cross links are formed between the polymeric solute and the polymer formed from the ethylenically unsaturated monomer(s), or a few mol percent, i.e., from about 0.1 to about 10 mol percent of monomer containing diethylenic unsaturation are included in the solution, cross linking occurs in the final shaped product which may cause it to be completely insoluble in known organic and inorganic solvents.

The occurrence and extent of cross linking and, accordingly, the degree of insolubility may be controlled by several factors:

(I) *Cross linking products via a monomer containing two or more ethylenically unsaturated groups.*—If no chemical reaction occurs with the polymeric solute, this route produces only a partially insoluble final product, i.e., the polymeric ingredient remains soluble. The polymer formed from the monomer(s) will be cross linked according to the concentration and reactivity of the bi- or poly-functional monomer.

(II) *Cross linking products via chemical linkage of the polymeric solute with the polymer formed from the monomer(s).*—This may be accomplished by various methods: (*a*) Chain transfer of the polymerizing monomer(s) with the polymeric solute. In this case the extent of cross linking depends on (1) the concentration of the polymeric solute, e.g., the higher the concentration the more cross links, (2) the chain transfer constant of the polymeric solute for the particular monomer(s), and (3) the molecular weight of the polymeric solute. Examples 11 to 15 which follow illustrate this polymerization method in which the polymeric ingredient is polyvinylpyrrolidone and the monomer is acrylonitrile. (*b*) Copolymerization of the polymerizing monomer(s) with a polymeric ingredient containing ethylenically unsaturated groups. In this case the extent of cross linking is governed by (1) the number of unsaturated groups in the polymeric ingredient, (2) the concentration of the polymeric ingredient, (3) the copolymerizability or reactivity of the unsaturated groups with the particular monomer(s), and (4) the molecular weight of the polymeric ingredient. This method is illustrated in Example 34. (*c*) Polymeric initiators, e.g., polymeric ingredient containing groups such as peroxide or azo groups which are capable of initiating vinyl polymerization by heat, redox activation, or light. The same facts as described in preceding (II)(*b*) are applicable except that (II)(*b*)(3) would relate to the initiating efficiency. This is illustrated in Example 37.

The procedures described in the foregoing paragraphs (I), (II)(*a*), (*b*) and (*c*) may be combined by any of the well-known methods to provide a variety of polymeric end products.

The expression "inherent viscosity" as used in the examples is defined as $$\ln \frac{\eta r}{c}$$

wherein $c$ is the concentration in grams of the polymer in 100 ml. of the solvent and $\eta r$ is the symbol for relative viscosity which is the ratio of the flow time of the polymer solution relative to the flow time of the solvent. The viscosity measurements for calculating inherent viscosity are made using a 0.5% solution by weight of the polymer in the solvent at 25° C.

The following examples in which parts and percentages are by weight unless otherwise indicated illustrate specific embodiments of the invention.

EXAMPLE 1

A solution having a viscosity of 250 poises at 5° C. was prepared at 0° C. from 77 parts of acrylonitrile, 23 parts of a butadiene/acrylonitrile copolymer rubber containing 33.5% acrylonitrile and having an inherent viscosity of 1.33 as measured in dimethylformamide, and 0.75 parts of a 90% solution of t-butyl hydroperoxide in t-butyl alcohol. This solution was maintained at 0° C. until it was extruded through a spineret hole of 1.5 mil diameter through an inert layer of nitrogen saturated with acrylonitrile into an atmosphere consisting of 92% (volume) sulfur dioxide and 8% nitrogen. This atmosphere was confined in a spinning cell three feet long, and was held at room temperature. The fiber produced was collected at the bottom of the spinning cell at a speed of 50 yards per minute. The denier of the filament was five. Analysis of this fiber showed that 65% of the acrylonitrile monomer had been converted to polymer in the fiber form. The fiber had a round cross section, an elongation of 150%, a tenacity at break of 1.8 grams per denier, and an initial modulus of 5.5.

EXAMPLE 2

A solution having a viscosity of 230 poises at 5° C. was prepared at 0° C. from 77 parts of acrylonitrile, 23 parts of a butadiene/acrylonitrile copolymer rubber containing 33.5% acrylonitrile and having an inherent viscosity of 1.33 as measured in dimethylforamide, and 2 parts of a 90% solution of t-butyl hydroperoxide in t-butyl alcohol. This solution was maintained at 0° C. until it was extruded through a spinneret hole of 2-mil diameter into a room temperature bath of purified kerosene saturated with acrylonitrile monomer and sulfur dioxide. Fiber withdrawn from this bath had properties similar to those of the fiber contained in Example 1.

EXAMPLE 3

Example 2 was repeated except that a solution having a viscosity of 150 poises containing 22 parts of the butadiene/acrylonitrile copolymer, 77 parts acrylonitrile, and 1 part of N-vinylpyrrolidone was extruded into a spinning cell saturated with sulfur dioxide gas. The fiber formed was passed through a kerosene bath. Analysis of fiber showed that 91% of the acrylonitrile was converted to polymer. The fiber had a round cross section and was clear, lustrous, and hard.

EXAMPLE 4

A solution having a viscosity of 7 poises containing 20% poly-N-vinylpyrrolidone (K–90 grade, molecular weight about 360,000) in acrylonitrile containing 1% of benzoin methyl ether was cast at 25° C. onto a flat glass plate using a doctor knife with a 0.002-inch clearance. The cast solution was irradiated with ultraviolet light from a 500-watt "Hanovia" lamp (Hanovia Chemical Manufacturing Company, Newark, New Jersey, Analytical Model Lamp) spaced at a distance of ten inches from the plate. After two minutes' irradiation, the polymerized film was removed from the glass plate and found to be clear and coherent. Analysis showed it to contain 65% of a polymerized acrylonitrile and the remainder poly-N-vinylpyrrolidone.

EXAMPLE 5

A solution having a viscosity of 130 poises at 10° C., composed of 30 parts of poly-N-vinylpyrrolidone (K–90 grade), 70 parts of acrylonitrile monomer, and 10 parts of a 60% solution of methyl ethyl ketone peroxide in dimethylphthalate, was prepared by mixing these ingredients at 0° C. This solution was extruded through a spinneret having five holes 0.002 inch in diameter into a spinning cell of 8-inch diameter and 9-foot length. The spinneret was coated with a thin layer of tetrafluoroethylene polymer. The walls of the spinning cell were heated to a temperature of 70° C., and an aspiration gas mixture consisting of 67% sulfur dioxide, 29% nitrogen, and 4% carbon dioxide was metered into the cell at a point near the spinneret at a rate of 3 cubic feet per minute. The fiber produced was collected at the bottom of the spinning cell at a speed of 100 yards per minute. The denier of the yarn bundle was 20 (2.2 tex). Analysis of this fiber showed 60% conversion of the acrylonitrile monomer to polymer. The final copolymer fiber contained 40% polyacrylanitrile and 60% poly-N-vinylpyrrolidone. The fiber obtained was compact and lustrous, had a fat dog bone shaped cross section, and was drawn 2.5 times its original length.

EXAMPLE 6

A solution having a viscosity of 200 poises was prepared from 68 parts of acrylonitrile, 32 parts of poly-N-vinylpyrrolidone (K–90 grade), and 10 parts of a 60% solution of methyl ethyl ketone peroxide in dimethylphthalate. This solution was maintained at 0° C. until it was extruded through a spinneret hole of 2-mil diameter through an inert layer of nitrogen saturated with acrylonitrile and into an atmosphere made up of 31% (by volume) sulfur dioxide and 69% nitrogen. The spinning cell was three feet long and was held at room temperature. The fiber was immediately passed at 34 yards per minute through a kerosene bath held at 76° C., and was then passed over a pair of canted rolls heated to 91° C., a sufficient number of turns being taken to give the yarn a residence time of one and one-half minutes on the rolls. After drying, the fiber had a denier of 38 (4.2 tex). Analysis showed that 90% of the acrylonitrile monomer had been converted to polymer in fiber form and that the fiber contained 66% acrylonitrile polymer and 34% poly-N-vinylpyrrolidone. The fiber was clear and lustrous, and had a density of 1.225 and a dog bone shaped cross section. After being drawn four times its original length over a roll heated to 230° C., the properties were as follows: tenacity—1.0 gram per denier and elongattion at the break—37%.

EXAMPLE 7

A solution having a viscosity of 250 poises was prepared from 71 parts acrylonitrile, 29 parts poly-N-vinylpyrrolidone (K–90 grade), and 8.5 parts of a 60% solution of methyl ethyl ketone peroxide in dimethylphthalate. This solution was maintained at −10° C. until it was extruded through a spinneret hole of 4-mil diameter through a thin layer of hexane into an atmosphere containing 45% sulfur dioxide and 55% nitrogen. The spinning cell was three feet long and was at room temperature, about 30° C. The yarn was removed from the cell at a speed of 100 yards per minute and was immediately passed through a bath of kerosene held at 60° C., and was then passed over a pair of canted rolls heated to 90° C., a sufficient number of turns being taken to give the yarn a residence time of thirty seconds in this step of the process. The yarn was then passed through a bath of water heated to 95° C., at which point it was stretched 100% of its original length. After drying, the yarn had a denier of 60 (6.6 tex). Analysis showed that 75% of the acrylonitrile monomer had been converted to polymer in fiber form and contained 65% acrylonitrile polymer and 35% poly-N-vinylpyrrolidone. The filament produced was clear and lustrous.

EXAMPLE 8

A solution having a viscosity of 5 poises containing 18% polyvinyl acetate dissolved in acrylonitrile containing benzoin methyl ether, as in Example 4, was irradiated according to the process of that example. The film obtained was coherent and uniformly opaque. A similar opaque, coherent film was obtained using a 9% solution of cellulose acetate in acrylonitrile, with the same benzoin methyl ether catalyst being used. When a thin layer of acrylonitrile monomer containing benzoin methyl ether was irradiated in like manner, a white powder of acrylonitrile polymer was obtained.

EXAMPLE 9

A solution having a viscosity of 200 poises at 8° C. consisting of 84 parts of acrylonitrile monomer, 16 parts of a polyvinylbutyral resin having a molecular weight of 225,000, and 8.5 parts of a 60% solution of methyl ethyl ketone peroxide in dimethylphthalate was prepared at 0° C. and spun according to the procedure of Example 5. A clear, uniformly lustrous fiber was obtained. Analysis showed that 65% of the acrylonitrile monomer had been polymerized during the spinning process. The final fiber contained 52% polyacrylonitrile and 48% polyvinylbutyral, and had a fat dog bone cross section.

EXAMPLE 10

A solution having a viscosity of 100 poises at 20° C., prepared from 90 parts of acrylonitrile monomer, 10 parts of a polyvinylbutyral resin having a molecular weight of 450,000, and 1 part of alpha,alpha'-azodiisobutyronitrile, was cast in film form and heated to 90° C. under a pressure of 20,000 pounds per square inch for five minutes. A clear, lustrous film was obtained. This film was cut into narrow strips which were oriented by stretching over a hot pin to 400% of their original length and were then boiled off in water. A sample of drawn film was found to have a breaking strength of 3.0 grams per denier and an elongation at break of 9% when measured at room temperature.

In other experiments it was found that the undrawn film could be oriented by stretching to as much as 1300% of its original length. Similar drawable, lustrous films were prepared from acrylonitrile solutions of polyvinylformal resins and polyvinylacetal resins. In all cases, the resins used were low in residual hydroxyl content.

The method of film preparation used in this example represents a rapid process for determining the usefulness of polymeric additives in the preparation of shaped articles from their solutions in polymerizable monomers. It was found by experiment that those solutions which form useful films by this method also form films according to the method of Example 4 and can be converted to fibers by the method of Example 5.

EXAMPLES 11–15

Repeating the procedure of Example 10, but substituting poly-N-vinylpyrrolidone for the polyvinylbutyral resin in amounts from 15% to 35%, film samples having the properties listed in Table I were prepared. In all of the examples, conversion of acrylonitrile monomer to polymer was 100%. Tenacity, initial modulus, and percent elongation were measured after the samples were drawn four times their length and boiled off. Solubility was determined by immersing the samples in boiling N,N-dimethylformamide. The stick temperature is determined by passing the polymer over a heated brass block.

*Table I*

|  | Examples | | | | |
|---|---|---|---|---|---|
|  | 11 | 12 | 13 | 14 | 15 |
| Acrylonitrile (percent) | 85 | 80 | 75 | 70 | 65 |
| Poly-N-vinyl-pyrrolidone (percent) | 15 | 20 | 25 | 30 | 35 |
| Solubility (percent) | 65 | 62 | 59 | 55 | ------ |
| Stick temperature (° C.) | 235 | 215 | 215 | 210 | ------ |
| Tenacity (Dry, 30° C.) | 1.35 | 1.47 | 1.44 | 1.26 | 0.65 |
| Initial Modulus | 50.9 | 47.8 | 36.8 | 32.7 | 12.3 |
| Elongation | 24.6 | 35.5 | 36.7 | 39.7 | 28.5 |
| Tensile Recovery (50° C., wet, 3% elongation) | 45.3 | 47.9 | 42.4 | 41.7 | 41.4 |

EXAMPLES 16–21

In the examples in Table II, the procedure of Example 10 was repeated with polyvinylbutyral resin which had been methacrylated with methacrylic anhydride by reacting 20 grams of polyvinylbutyral with amounts of the anhydride as indicated in the table. In each example, the resin was present in an amount equal to 17.5% of the acrylonitrile.

*Table II*

|  | Examples | | | | | |
|---|---|---|---|---|---|---|
|  | 16 | 17 | 18 | 19 | 20 | 21 |
| Anhydride (gm.) | 10 | 5 | 2 | 1 | 0.5 | 0.2 |
| Solubility (percent) | 16 | 25.5 | 42.5 | 72 | 80 | 93 |
| Stick temperature (° C.) | 235 | 245 | 225 | 235 | 220 | 225 |
| Draw ratio | 5.5 | 6.5 | 7.5 | 8.0 | 8.0 | 8.0 |
| Tenacity (Dry, 30° C.) | 0.86 | 1.36 | 1.32 | 2.05 | 2.23 | 1.34 |
| Initial Modulus | 26 | 35.8 | 42.2 | 51.8 | 59.6 | 59.5 |
| Elongation | 16.3 | 14.8 | 17.8 | 11.4 | 13.3 | 13.0 |
| Tensile Recovery (50° C., wet, 3% elongation) | 56.0 | 45.0 | 52.3 | 53.3 | 46.2 | 44.0 |

The foregoing data illustrates the effect of the level of unsaturation in the polymeric solute when a constant concentration of solute is utilized. It will be noted that even when the polymeric solute contains only a small proportion of the unsaturated material, the solubility of the final product is low, indicating a relatively high degree of cross linking.

EXAMPLES 22–26

In the examples in Table III, the procedure of Example 10 was repeated except that the polyvinylbutyral resin was replaced by "Adiprene" * C, a urethane rubber prepared in accordance with U.S. Patent 2,808,391, in the amounts listed in the table. The solubility of film samples prepared was determined by extracting the samples for two hours in boiling N,N-dimethylformamide.

*Registered trademark for Du Pont's urethane rubber.

Table III

| | Examples | | | | |
|---|---|---|---|---|---|
| | 22 | 23 | 24 | 25 | 26 |
| "Adiprene" C (percent) | 10 | 15 | 20 | 25 | 37.5 |
| Solubility (percent) | 21 | 16 | 15.8 | 14.5 | 10 |
| Stick temperature (° C.) | | 265 | 280 | 265 | 285 |
| Draw ratio | | 4.5 | 3.8 | 3.7 | 2.5 |
| Tenacity (Dry, 30° C.) | | 2.11 | 1.60 | 1.14 | 0.52 |
| Initial Modulus | | 43.9 | 31.5 | 27.4 | 7.2 |
| Elongation | | 28.0 | 42.1 | 42.7 | 180 |
| Tensile Recovery (50° C., wet, 3% elogation) | | 57.3 | 55.1 | 62.6 | 68.2 |

EXAMPLES 27–30

The procedure of Example 10 was repeated except that a solution containing 15% of "Paracril," butadiene/acrylonitrile rubber copolymer manufactured and sold by the Naugatuck Chemical Company, and 85% acrylonitrile was shaped to provide films described in Table IV. The composition of the butadiene/acrylonitrile copolymers and their inherent viscosities are measured in a 0.5% concentration of the copolymer in N,N-dimethylformamide are set forth in the first two lines of the table.

Table IV

| | Examples | | | |
|---|---|---|---|---|
| | 27 | 28 | 29 | 30 |
| Mol percent acrylonitrile | 40 | 33.5 | 33.5 | 34 |
| Inherent viscosity | 1.35 | 1.20 | 1.33 | 1.48 |
| Solubility (percent) | 3.9 | 3.3 | 3.5 | 0 |
| Stick temperature (° C.) | 260 | | 265 | 295 |
| Draw ratio | 2 | 2 | 2 | 2 |
| Tenacity (Dry, 30° C.) | 1.20 | 1.03 | 1.11 | 1.39 |
| Initial Modulus | 41.4 | 27.2 | 19.9 | 29.8 |
| Elongation | 15.4 | 14.9 | 14.9 | 19.3 |

For comparative purposes, a film sample of an acrylonitrile polymer containing 94% acrylonitrile, 5.7% methacrylate, and 0.3% sodium styrenesulfonate was prepared according to U.S. Patent 2,837,501. A sample drawn four times exhibited the following properties: tenacity, 1.11 grams per denier, initial modulus of 28.3, an elongation of 14.9%, and a wet tensile recovery at 3% elongation and 50° C. of 33.3%.

EXAMPLE 31

Films were prepared from solutions of a number of synthetic rubbers dissolved in acrylonitrile using the same alpha,alpha'-azodiisobutyronitrile catalyst and procedure of Example 10. Solutions containing between 10% and 20% of "Hycar," butadiene/acrylonitrile copolymer, manufactured and sold by B. F. Goodrich Chemical Company, dissolved in acrylonitrile, gave clear, lustrous films which were surprisingly tough and flexible. These films, which could be stretched to 200% of their original length, were essentially insoluble in known solvents for polyacrylonitrile or butadiene/acrylonitrile copolymers.

Clear, coherent films were obtained from solutions containing as little as 4% of a "Hycar" No. 1432 butadiene/acrylonitrile copolymer dissolved in acrylonitrile monomer.

EXAMPLE 32

A film was prepared from an acrylonitrile solution containing 20% of a 40/60 hexafluoropropylene/vinylidene fluoride copolymer following the procedure of Example 10. The coherent film obtained was moderately tough and flexible. It could be stretched to 400% of its original length. It was uniformly delustered and retained its uniform opacity during boil-off and drying. This product was readily soluble in N,N-dimethylformamide.

EXAMPLE 33

Using the method of the preceding example, clear, lustrous films were obtained from acrylonitrile solutions containing from 10% to 30% of the following resins:

Polymethyl methacrylate
Polyethyl methacrylate
Polyisobutyl methacrylate
Polymethyl acrylate
Polymethoxyethyl acrylate
Poly-beta-chloroethyl acrylate
Poly-beta-bromoethyl acrylate
Poly-alpha-chloromethyl acrylate
Poly-alpha-bromomethyl acrylate
Polyethylene oxide
Polypropylene oxide
Chloroprene/acrylonitrile (75/25)
Polyethyleneimine
Cyanoethylated polyethyleneimine
Polyethylene maleamide
Poly-bis(-2-chloroethyl)vinyl phosphate
Polydiethyl vinyl phosphate

EXAMPLE 34

A sample of cotton linters was esterified, first with acetic anhydride and then with methacrylic anhydride to produce a cellulose ester containing 2.5 acetyl groups and 0.15 methacrylyl group per glucose molecule. A solution of 15 parts of this material and 85 parts of acrylonitrile monomer in 100 parts of acetone was polymerized using alpha,alpha'-azodiisobutyronitrile as catalyst. The polymer, which precipitated as a gelatinous mass, was washed with water and acetone, and dried at room temperature. It was insoluble in all known solvents for acrylonitrile polymers and, hence, could not be converted to a fiber or film by the usual shaping methods.

A solution having a viscosity of 150 poises containing 15 parts of the same cellulose ester in 85 parts of acrylonitrile monomer containing 0.85 part of alpha,alpha'-azodiisobutyronitrile was cast in film form and polymerized as in Example 10. A clear film of unusually high luster was obtained, which film could be stretched to 300% of its original length. The unstretched film had a stick temperature of 300° C. as compared to 250° C. for a solvent-cast film of polyacrylonitrile. The film containing the cellulose ester was 52% insoluble in boiling N,N-dimethylformamide. Films showing varying degrees of swellability in N,N-dimethylformamide were prepared from solutions containing larger amounts of the same cellulose ester dissolved in acrylonitrile and from solutions of cellulose esters containing a higher number of methacrylyl groups per cellulose molecule.

A clear, lustrous fiber, containing 80% acrylonitrile and 20% of the cellulose ester described above, was prepared by spinning a solution using the catalyst and procedure of Example 1.

EXAMPLE 35

Fifteen (15) parts of cellulose acetate containing 54% combined acetic acid did not dissolve completely in 85 parts of acrylonitrile at room temperature. Addition of 8 parts of N-vinyl-methylformamide produced a clear solution which could be spun or cast. 0.9 part of alpha,alpha'-azodiisobutyronitrile was added to this solution and a film was prepared according to the method described in Example 10. The film obtained was clear and lustrous, and could be stretched 400%. Both the acrylonitrile and the N-vinyl-methylformamide were completely converted to polymer.

EXAMPLE 36

A clear solution having a viscosity of 200 poises containing 17 parts of polyvinylbutyral (molecular weight 450,000), 83 parts acrylonitrile, 0.83 part of alpha,alpha'-azodiisobutyronitrile and 0.83 part of trimethylammonium styrenesulfonate was cast in film form and polymerized as in the previous example. A clear film resulted which dyed to a deep green with the basic dye C.I. 42040, using the usual dyeing technique for basic dyes. A film prepared without the trimethylammonium styrenesulfonate in the starting mixture dyed only very slightly under the same conditions.

EXAMPLE 37

A copolymer of acrylonitrile and alpha-methyl-para-isopropyl styrene, 1:1 molar ratio, was air-oxidized in dioxane solution according to the following reaction:

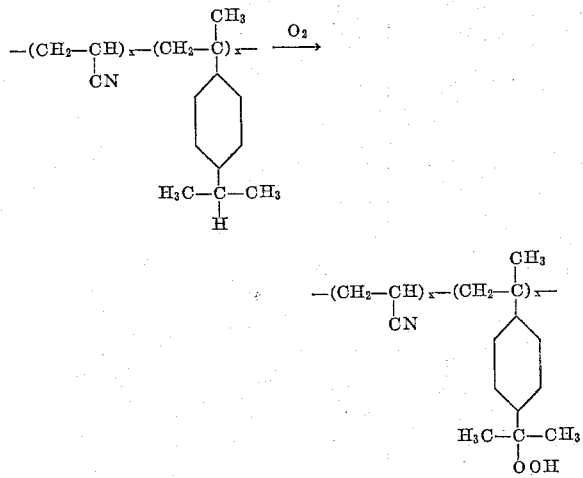

The oxidized polymeric product was soluble in acrylonitrile. A film, containing 15% of the copolymer and 85% acrylonitrile, was prepared by casting a copolymer/acrylonitrile solution (15/85) onto a polyester sheet and quickly dipping it beneath the surface of an aqueous solution saturated at 25° C. with sodium sulfate, acrylonitrile and sulfur dioxide. The film was clear and lustrous.

EXAMPLE 38

A clear solution having a viscosity of 210 poises prepared from 80 parts of acrylonitrile, 20 parts of vinylidene chloride, 25 parts of polyvinylbutyral, having a molecular weight of 450,000, and 1 part of alpha,alpha'-azodiisobutyronitrile was cast in film form and polymerized according to the procedure of Example 10. A clear film was obtained which could be drawn 700% by passing it in contact with a heated surface. This film had reduced flammability as compared with a film prepared similarly but without vinylidene chloride comonomer.

EXAMPLE 39

A clear solution having a viscosity of 150 poises was prepared from 85 parts of acrylonitrile, 2 parts of ethylene-bis-acrylate, 15 parts of polyvinylbutyral having a molecular weight of 450,000, and 0.85 part of alpha,alpha'-azodiisobutyronitrile. The solution was cast in film form and then polymerized according to the method described in Example 10. The polymerized film was clear and could be stretched 400% by passing it in contact with a heated surface. This film was more insoluble in solvents for polyacrylonitrile than a similar film in which the ethylene-bis-acrylate was omitted.

EXAMPLE 40

A clear solution having a viscosity of 230 poises containing 80 parts of vinylidene chloride, 20 parts of polyvinylbutyral, and 0.8 part of alpha,alpha'-azodiisobutyronitrile was cast in film form and polymerized as described in Example 10. A coherent film was obtained which was translucent.

EXAMPLE 41

A solution having a viscosity of 150 poises was prepared from 85 parts of acrylonitrile, 15 parts of cellulose-acetate-methacrylate prepared as described in Example 34 and containing 2.5 acetyl groups and 0.15 methacrylyl group per glucose unit, and 8 parts of a 60% solution of methyl ethyl ketone peroxide in dimethylphthalate. This solution was maintained at 0° C. until it was extruded through an orifice of 5-mil diameter into a bath of purified kerosene which was saturated with acrylonitrile containing 2% sulfur dioxide and held at a temperature of 30° C. The yarn formed was given a residence time of two minutes in the bath and was then collected and dried. The filament produced was clear, lustrous, and essentially insoluble in dimethylformamide.

EXAMPLE 42

Films were prepared using the procedure of Example 10 from each of the following combinations of ingredients:
 (a) 62.5% "Adiprene" C and 37.5% acrylonitrile, and
 (b) 70% of a low molecular weight fraction (inherent viscosity of 0.4 in N,N-dimethylformamide) of "Paracril" butadiene/acrylonitrile copolymer (containing 40 mol percent acrylonitrile) and 30% acrylonitrile.

In each instance the films were clear, tough, and rubbery.

EXAMPLE 43

A solution having a viscosity of 120 poises at −20° C. composed of 15 parts of poly-betamethoxyethylacrylate and 85 parts of acrylonitrile (both components vigorously freed from traces of water and other impurities containing active hydrogen) was prepared at −20° C. under pure nitrogen. This solution was extruded through an orifice of 0.002-inch diameter into a spinning bath consisting of 0.5 part of benzophenone, 0.2 part of sodium, and 99.3 parts of dry ethylene glycol dimethylether. Extreme care was taken to prevent any contamination by water, oxygen, carbon dioxide which would inactivate the catalyst system. There was obtained a coherent filament containing more than 90% of the original acrylonitrile in polymerized form. The fiber was slightly yellow and opaque and could be drawn two times its original length by contacting with a hot (150°–160° C.) surface.

EXAMPLE 44

A film of 0.15 mil thickness was cast on the surface of a polyester sheet, using a solution of 23 parts or "Paracril" butadiene/acrylonitrile copolymer containing 33.5 mol percent acrylonitrile having an inherent viscosity of 1.33 as measured in dimethylformamide, 72 parts of acrylonitrile monomer and 5 parts of t-butylhydroperoxide (90% purity). This supported film was quickly dipped beneath the surface of an aqueous solution saturated at 25° C. with sodium sulfate, acrylonitrile and sulfur dioxide.

The solution was saturated with acrylonitrile to prevent extraction of this material from the film. The solubility of acrylonitrile in the sodium sulfate solution is about 2 g./100 g. of solution. A stream of sulfur dioxide bubbles was passed through the solution before and during the experiment. After five minutes, the film was removed, washed with acetone to remove catalyst, and dried. It was compact, tough, and semielastic. Its polyacrylonitrile to rubber ratio was 56:44.

EXAMPLE 45

A solution having a viscosity of 134 poises at 8° C. was prepared from 75 parts of acrylonitrile and 25 parts of butadiene/acrylonitrile rubber containing 34% acrylonitrile and 8 parts of a 60% solution of methylethylketone peroxide in dimethylphthalate. This solution was extruded through a spinneret using the procedure and conditions of Example 1. The resulting fiber was collected at 50 yards per minute. Analysis of this fiber showed that 6% of the monomer had been converted to polymer. The fiber was slightly swellable but essentially insoluble in boiling dimethylformamide. The fiber had an elongation of 205% and a recovery of 97% from 200% elongation. The stress required to extend it 200% was .016 gram per denier.

As indicated in the examples, the process of this invention is useful in the direct preparation of shaped articles from ethylenically unsaturated monomers which can not ordinarily be so shaped because of the insolubility of their polymers in the monomer. When monomers such as acrylonitrile are polymerized in bulk, the insolubility of the polymer produced is such as to cause its separation from the monomer in the form of separate particles which do not become fused together. Coherent shapes cannot be prepared by direct polymerizaton of these monomers. As shown, however, it is possible to prepare coherent shaped articles from these monomers by the simple expedient of dissolving dissimilar polymeric materials in them prior to the combined shaping and polymerizing operation. It is indeed surprising that any polymeric solute will bring about the desired behavior as long as the solute is soluble to the extent that it produces a solution having a viscosity between about 5 and 1000 poises at the temperature of shaping.

It will be apparent from the foregoing examples that a wide variety of wet and dry shaping conditions may be used. In the production of filaments by dry spinning or casting, any one of the many known catalysts, e.g., peroxy catalysts such as methyl ethyl ketone peroxide, t-butylhydroperoxide, hydroheptyl peroxide, cyclohexanone peroxide, hydrogen peroxide, 2,5-dimethyl hexane, 2,5-dihydroperoxide, pinane peroxide, cumene hydroperoxide, and activators such as sulfur dioxide and hydrogen sulfide, may be used. Catalysts activated by ultraviolet light such as difluorodiazine, trifluoromethylhypofluoride, benzoin, benzoin methyl ether, and alpha,alpha'-azodiisobutyronitrile. In addition, known thermally activated catalysts such as the peroxides and azo catalysts which yield free radicals below the boiling point of the monomers may be used. In the wet spinning or shape casting process, well-known redox polymerization systems, the systems used in dry spinning, as well as anionic initiators may be used. In using anionic systems such as sodium benzophenone and lithium naphthalene in the polymerization of a monomer such as acrylonitrile and a polymeric solute such as polymethyl methacrylate, butadiene acrylonitrile copolymers and polytetrahydrofurane, care must be taken in order to avoid any impurities. In addition, the selection of the polymeric solute must be carefully chosen in order to prevent interference with polymerization of the monomer.

In the dry shaping process the medium surrounding the shaped article, which merely acts as an inert medium for the polymerization process, may be selected from any of a number of suitable gaseous media such as nitrogen, helium, carbon monoxide, carbon dioxide, hydrogen, hydrocarbons, and halogenated derivatives of the hydrocarbons such as methylene chloride, methyl chloride, ethyl chloride, as well as other low-boiling inert materials such as methyl fluoride, methylene fluoride, etc.

In the wet spinning process, the liquid media may be selected from materials conventionally used in wet spinning processes, e.g., kerosene, decahydronaphthalene, Stoddard solvent, n-hexane, and water. Also mixtures of the aforementioned materials may be used. In addition, the liquid media may contain one or more monomers. For example, in wet spinning acrylonitrile, it may be desirable to utilize a liquid medium saturated with acrylonitrile in order to prevent or minimize the loss of monomer.

The type of polymeric product which will be provided by the process of this invention can be readily predicted. When the polymeric solute is compatible with the polymer being produced, the shaped article will be transparent. Thus, poly-N-vinylpyrrolidone and polyacrylonitrile are compatible, as may be shown by casting a film from a solution of these two polymers dissolved in dimethylformamide. The solution prepared is clear and homogeneous, and the film remaining after removal of the solvent also has these characteristics, both before and after treatment with boiling water.

Clear, compatible shaped articles also result when the acrylonitrile reacts with the polymeric solute during its polymerization. For example, the polymeric solute may contain unsaturated linkages which enter into the vinyl polymerization, as in the case of the butadiene/acrylonitrile copolymer and the cellulose acetate-methacrylate polymers used in the examples. The reaction between the acrylonitrile and the polylmeric solute may also be one of chain transfer by the polymer during the polymerization. This is believed to be the reason for the clarity of the shaped structures prepared from solution of polyvinylacetals and of polymethyl methacrylate and similar polymers dissolved in acrylonitrile.

Where practically no reaction can occur between the polymeric solute and the polymerizing monomer, and where the polymeric solute and the polymer produced from the monomer alone are not compatible, the resulting structure will be coherent, but will be uniformly delustered rather than transparent. An example of this type is the product prepared from a solution of a hexafluoropropylene/vinylidene fluoride copolymer dissolved in acrylonitrile. This polymer does not contain double bonds which can enter into the polymerization, nor does it possess chain transfer activity in polymerization of acrylonitrile. The polymerization-shaping process thus produces an intimate mixture of the two polymeric species, which is sufficient to produce a coherent structure. The structure is not transparent because it is composed of two dissimilar species of molecules, but it is an unusually stable structure.

Examples of the polymeric solutes which may be dissolved in, for example acrylonitrile monomer, to produce the novel insoluble products of this invention are polyvinylformal, polyvinylacetal, polyvinylbutyral, methacrylated polyvinylbutyral, crotonated polyvinylbutyral, cellulose acetate/cellulose methacrylate, cellulose acetate/cellulose crotonate, cellulose acetate/cellulose butyrate/cellulose crotonate, crotonated ethyl cellulose, methacrylated ethyl cellulose, acrylonitrile/butadiene copolymers, polyurethanes, and tetrahydrofuran/1,2-propylene oxide/3-allyl oxymethyl-3-methyl oxetane copolymers. As indicated earlier, the degree of solubility of many of the final products can be varied as a function of the exact composition and amount of polymeric material utilized. Insoluble products are also obtained when difunctional monomers are incorporated into the monomeric portion of the solution being shaped.

Examples of the polymeric materials which produce lustrous, polymeric products when shaped from solutions, e.g., in acrylonitrile, are cyanoethylated polyvinylalcohol, polyvinylpyrrolidone, polymethylvinyloxazolidone, acrylonitrile/methacrylonitrile, N-vinylpyrrolidone/vinyl formate, N-vinylpyrrolidone/vinyl acetate, acrylonitrile/alpha - methylstyrene, methacrylonitrile/alpha - methylstyrene, N-methylvinylformamide/vinyl acetate, acrylonitrile/N-vinylpyrrolidone polymers, cyanoethyl cellulose, nitrocellulose, polymethyl acrylate, polyethyl acrylate, polymethoxyethyl acrylate, polymethyl methacrylate, polyisobutyl methacrylate, and polytetrahydrofuran. Among the polymeric materials producing products having luster of a low degree are polyvinyl formate, polymethacrylonitrile, polyvinyl methyl ether, polyvinyl ethyl ether, ethyl acrylate/chloroethyl vinyl ether copolymer, methyl methacrylate/acrylonitrile/ethyl acrylate polymer, cellulose acetate, cellulose propionate, cellulose acetate/cellulose butyrate, ethylcellulose, and hexafluoropropylene/vinylidene fluoride copolymer.

The following are among the great number of polymeric solutes, e.g., soluble in acrylonitrile, in addition to those already mentioned, which may be used in preparing shaped articles in accordance with this invention:

HOMOPOLYMERS

Vinyl polymers:
  Poly(vinylchloroformate)
  Poly(vinylpropionate)
  Poly(vinyltrifluoroacetate)
  Poly(vinylchloroacetate)
  Poly(methylvinylketone)
  Poly(isopropylvinylketone)
  Poly(vinylethylether)
  Poly(2-methoxyethyl-vinylether)
  Poly(2-chloroethyl-vinylether)
  Poly(2-cyanoethyl-vinylether)
  Poly(methyl-N-vinylpyrrolidone)
  Poly(vinylcaprolactam)
  Poly(3-vinyl-3-methyl-oxazolidone)
  Poly(bis-chloroethyl-vinylphosphonate)
  Poly(diethyl-vinylphosphonate)

Poly-acrylics and -methacrylics:
  Poly(methylacrylate)
  Poly(methyl-alpha-chloroacrylate)
  Poly(methyl-alpha-bromoacrylate)
  Poly(ethylacrylate)
  Poly(2-methoxyethylacrylate)
  Poly(2-chloroethylacrylate)
  Poly(2-bromoethylacrylate)
  Poly(2-cyanoethylacrylate)
  Poly(diethylaminoethylacrylate)
  Poly(dimethylaminoethylmethylacrylate)
  Poly(dimethylacrylamide)
  Poly(alpha-cyano-ethylacrylate)
  Poly(isopropylacrylamide)
  Poly(methyl-methacrylate)
  Poly(ethyl-methacrylate)
  Poly(butyl-methacrylate)
  Poly(2-cyanoethyl-methacrylate)
  Poly(2-chloroethyl-methacrylate)
  Poly(2-methoxyethyl-methacrylate)
  Poly(2-ethoxyethyl-methacrylate)
  Poly(2-bromoethyl-methacrylate)
  Poly(dimethylaminoethyl-methacrylate)
  Poly(diethylaminoethyl-methacrylate)
  Poly(methacrylonitrile)
  Poly(glycidylmethacrylate)

Cellulose derivatives and related polymers:
  Ethylcellulose
  Cyanoethylstarch
  Cyanoethylamylose

COPOLYMERS

Acrylonitrile (AN) copolymers (feed composition, by volume):
  AN-N-vinylpyrrolidone (1:9, 2:8, 3:7, 4:6, 5:5)
  AN-methacrylate (1:1)
  AN-methylmethacrylate (1:1)
  AN-ethylacrylate
  AN-vinylchloroacetate (1:1)
  AN-methoxyethylacrylate (1:1)
  AN-methyl-alpha-chloroacrylate (1:1)
  AN-methyl-alpha-bromoacrylate
  AN-vinylethylether (1:1, 3:5)
  AN-vinylmethylether (1:1)
  AN-vinylisobutylether (1:1)
  AN-vinyl-beta-chloroethylether (3:5)
  AN-dimethylaminoethylmethacrylate (1:1)
  AN-dimethylacrylamide (3:5)

Methacrylonitrile (MAN) copolymers:
  MAN-acrylonitrile (9:1, 8:2, 7:3, 6:4)
  MAN-vinylacetate (1:1)
  MAN-vinylchloroacetate (1:1)
  MAN-vinylmethylformamide (1:1, 9:1, 8:2, 7:3, 6:4)
  MAN-N-vinylpyrrolidone (9:1, 8:2, 7:3, 6:4, 5:6)
  MAN-beta-cyanoethylacrylate (1:1)
  MAN-beta-cyanoethylmethacrylate (1:1)

N-vinylpyrrolidone (NVP) copolymers:
  NVP-vinylchloroacetate (1:1)
  NVP-methylacrylate (1:1)
  NVP-beta-cyanoethylacrylate (1:1)
  NVP-vinylmethylether (1:1)
  NVP-vinylethylether (1:1, 2:1)
  NVP-vinylisobutylether (1:1)
  NVP-2-chloroethylvinylether (1:1, 1:9, 2:8, 7:3, 6:4)
  NVP-bis-chloroethyl vinylphosphonate (1:1, 1:4, 1:1.5)
  NVP-dimethylacrylamide (1:9, 2:8, 1:1)
  NVP-N-vinylcaprolactam (1:1)
  NVP-N-vinylmethylformamide (1:1)

N-vinylmethylformamide (NVMF) copolymers:
  NVMF-vinylchloroacetate (1:4)
  NVMF-methacrylonitrile (1:1)
  NVMF-methylacrylate (1:1)
  NVMF-methoxyethylacrylate (1:1)
  NVMF-vinylformate (1:1)
  NVMF-vinylmethylketone (1:1)
  NVMF-dimethylacrylamide (1:1)
  NVMF-bis-chloroethylvinylphosphonate (1:1)
  NVMF-vinylethylether (1:1 AN-soluble>50° C.)
  NVMF-vinyl-2-chloroethylether (1:1)
  NVMF-vinylisobutylether (AN-soluble>50° C.)

Miscellaneous copolymers:
  Vinylacetate-beta-cyanoethylacrylate (1:1)
  Vinylchloroacetate-beta-cyanoethylacrylate (1:1)
  Vinylacetate-vinylformate (1:1)
  Vinylformate-vinylethylether (1:1)
  Vinylformate-methylacrylate (1:1)
  Vinylformate-methylvinylketone (1:1)
  Vinylformate-vinylchloroacetate (1:1)
  Vinylformate-methoxyethylacrylate (1:1)
  Vinylformate-bis-chloroethylvinylphosphonate (1:1)
  Methylmethacrylate-AN (85/15)
  Methylmethacrylate-vinylmethylpyridine (85/15)

TERPOLYMERS

Vinylacetate/NVP/AN (2:1:1)
Vinylacetate/MAN/AN (2.5:2:1)
Beta-cyanoethylacrylate/AN/vinylacetate (5:3:2)
AN/NVP/vinylethylether (1:1:1)
NVP/dimethylacrylamide/chloroethylvinylether (3:2:5)

Since many of the polymeric solutes which have been listed are completely incompatible with polyacrylonitrile or its copolymers, it is indeed surprising that these materials produce products of excellent coherence when utilized in the present invention and, especially, that many of these products are homogeneous to the point of transparency and good luster, as indicated.

As has been indicated, this invention is useful in the preparation of shaped articles from any ethylenically unsaturated monomer which does not act as a solvent for its own polymer. It is applicable to mixtures of monomers as well as single ingredients. Because of its rapidity of polymerization and the desirable properties of its products, acrylonitrile is the monomer of greatest value in the process. Polymers that are soluble in acrylonitrile and useful in the invention have been mentioned earlier. Copolymers which are useful as a solute must meet the requirements of solubility previously set forth. It will be obvious that the copolymers containing acrylonitrile can not be too high in acrylonitrile content and still be soluble in acrylonitrile. For example, the acrylonitrile/methacrylonitrile copolymers are useful when they have an acrylonitrile content of not more than about 45%. Mixtures of polymers may also be used. For example, one may shape a solution of a butadiene/acrylonitrile copolymer and a polyethylene oxide such as "Polyox" WSR-301, sold by Union Carbide Corporation, dissolved in acrylonitrile. Since polyethylene oxide is available over a wide range of molecular weights, it is possible to control the viscosity of an acrylonitrile solution containing a mixture of polymers by using a relatively small amount of the polyethylene oxide.

The shaped articles prepared by the process of this invention will generally be amenable to further processing, e.g., stretching, to improve physical properties. In most instances, the amount of additional processing after the shaping step that is required to improve physical properties will be substantially decreased in comparison to products prepared by known processes in which solvents which must be extracted and recovered are present. In preparing the products of the present invention, if plasticizers, softening agents, delusterants, and other usual additives common to textile fibers and films are desired in the final product, they should be so chosen as not to be removed by the shaping process. Thus, in wet shaping, the additive should be essentially insoluble in the liquid medium, and in dry shaping the additive should be of low vapor pressure at the temperature of the shaping operation.

The products of this invention may be used in a variety of applications. The filaments are useful in textile applications, e.g., bristles, fibers, yarns, cloth, etc., with the insoluble structures being particularly useful in industrial filtration systems. The thin films may be used in wrapping material or may be produced in situ for use as coatings.

Among the most important advantages of this invention is the fact that no solvent need be used in the shaping operation, thus obviating the necessity for a recovery process. Solvent recovery generally involves a separate extraction step which is costly, in addition to the step of recovering the solvent from the extractant. By avoiding the extraction step, the present process lends itself more easily to continuous processing involving both shaping and stretching, where the latter is desired for property improvement.

Another important advantage resides in providing new products not otherwise obtainable. Completely insoluble cross-linked polymeric materials may be produced in fibrous or pellicular form, which was not possible prior to the present invention. Many of these structures have unusual properties in terms of toughness and flexibility. Their insolubility makes them ideally suited for uses in the handling of chemicals such as the preparation of filter cloths used in industrial filtrations.

As many widely different embodiments of this invention may be made without departing from the spirit and scope thereof, it is to be understood that this invention is not to be limited to the specific embodiments thereof except as defined in the appended claims.

I claim:

1. A process for preparing a solid shaped article from at least one ethylenically unsaturated monomer which is polymerizable at a temperature below its boiling point and the addition polymers of which are insoluble in said monomer which comprises dissolving an organic polymer in said ethylenically unsaturated monomer to provide a viscous solution, shaping said solution and immediately thereafter polymerizing said monomer to form said shaped article, said organic polymer being present in said solution in an amount from about 4% to about 90% by weight of said solution to provide a viscosity of at least about 5 poises at a shaping temperature in the range from about −80° C. to 90° C.

2. The process of claim 1 wherein said ethylenically unsaturated monomer is acrylonitrile.

3. The process of claim 1 wherein said organic polymer contains carbon-to-carbon unsaturation.

4. The process of claim 1 wherein said organic polymer is a butadiene/acrylonitrile copolymer.

5. A process for preparing solid shaped articles from monomers having ethylenic unsaturation which are polymerizable at a temperature below their boiling points and the addition polymers of which are insoluble in said monomers which comprises dissolving an organic polymer in at least one of said monomers to provide a solution containing from about 4% to about 90% by weight of said organic polymer and having a viscosity of from about 15 to 1000 poises at a shaping temperature in the range from about −80° C. to about 90° C., shaping said solution to form an elongated shaped article, and simultaneously polymerizing said monomer in the presence of a polymerization catalyst.

6. The process of claim 5 wherein said organic polymer is coreactive with said monomer.

7. The process of claim 6 wherein said monomer is acrylonitrile.

8. The process of claim 7 wherein said organic polymer is a butadiene/acrylonitrile copolymer.

9. The process of claim 7 wherein said organic polymer is a polyurethane.

10. The process of claim 7 wherein said organic polymer contains ethylenic unsaturation.

11. A process for preparing a solid filamentary structure from ethylenically unsaturated monomers which are polymerizable at a temperature below their boiling points and the addition polymers of which are insoluble in said monomers, said monomers being selected from the group consisting of acrylonitrile, vinylidene chloride, vinylidene cyanide, alpha-chloroacrylonitrile, vinyl fluoride, vinylidene fluoride, tetrafluoroethylene, and vinyl chloride, which comprises shaping a solution comprising an organic polymer dissolved in at least one of said ethylenically unsaturated monomers by extruding it through an orifice and polymerizing said monomer in the presence of a polymerization catalyst therefor as said solution departs from said orifice, said organic polymer being present in said solution in an amount from about 4% to about 90% by weight of said solution to provide a viscosity of from about 15 to about 1000 poises at a shaping temperature in the range from about −80° C. to 90° C.

12. The process of claim 11 wherein said polymerization catalyst is comprised of a hydroperoxide and sulfur dioxide.

References Cited in the file of this patent

UNITED STATES PATENTS

| | | |
|---|---|---|
| 2,620,324 | Coover et al. | Dec. 2, 1952 |
| 2,738,252 | Lutgerhorst | Mar. 13, 1956 |
| 2,839,354 | Moelter | June 17, 1958 |
| 2,891,837 | Campbell | June 23, 1959 |
| 2,949,435 | Davis et al. | Aug. 16, 1960 |
| 3,015,858 | Hendricks | Jan. 9, 1962 |